United States Patent [19]

Sundararajan et al.

[11] Patent Number: 5,648,657
[45] Date of Patent: Jul. 15, 1997

[54] SENSOR FOR MEASURING A MOVEMENT CHARACTERISTIC OF AN OBJECT

[75] Inventors: Srinivasan Sundararajan, Belleville; Karin H. Przybylo, West Bloomfield; Jerome P. Teevens, Plymouth, all of Mich.

[73] Assignee: Ford Motor Company, Dearborn, Mich.

[21] Appl. No.: 597,136

[22] Filed: Feb. 6, 1996

[51] Int. Cl.[6] .................................................. G01D 5/34
[52] U.S. Cl. .................... 250/231.1; 250/559.32; 73/11.03; 180/282
[58] Field of Search .......................... 250/231.1, 223 R, 250/231.18, 559.32; 356/28; 73/11.02, 11.03, 12.04, 488, 490–493; 340/436, 441, 669–670; 180/275, 279, 280–282, 169; 280/728.1, 734–735

[56] References Cited

U.S. PATENT DOCUMENTS

| | | | |
|---|---|---|---|
| 4,128,761 | 12/1978 | Oehler | 250/222 R |
| 4,580,894 | 4/1986 | Wojcik | 356/28 |
| 4,770,527 | 9/1988 | Park | 356/28 |
| 4,853,675 | 8/1989 | Foster | 340/440 |
| 5,029,473 | 7/1991 | Jost et al. | 280/735 |
| 5,155,307 | 10/1992 | Breed et al. | 200/61.45 R |
| 5,333,874 | 8/1994 | Arnold et al. | 273/185 B |

*Primary Examiner*—Que Le
*Attorney, Agent, or Firm*—Daniel M. Stock

[57] ABSTRACT

A sensor for measuring a movement characteristic of an object has a housing, an emitter emitting electromagnetic radiation, a detector for receiving electromagnetic radiation, a rod having a graduated scale with a plurality of first regions and second regions for reflecting the electromagnetic radiation from the emitter. A plurality of rollers positions the rod within the housing. As the object moves the first and second regions, the emitter and detector reflect different levels of electromagnetic radiation. The detector generates an output voltage corresponding the level of reflected radiation from the scale. The output voltage is then converted into displacement, velocity, or acceleration.

20 Claims, 2 Drawing Sheets

SENSOR FOR MEASURING A MOVEMENT CHARACTERISTIC OF AN OBJECT

FIELD OF THE INVENTION

The present invention relates generally to velocity measurement, and more specifically to velocity measurement during a crash test impact.

BACKGROUND OF THE INVENTION

In a crash test environment it is very difficult to measure the velocity between two surfaces at the point or in the proximity of contact. A conventional accelerometer, for example, may not withstand a side impact test due to the close proximity of the test dummy to the reference surface. Another problem with measuring velocities in limited space is that the instrumentation itself may change the characteristics of the crash object and thus affect the crash data.

It would therefore be desirable to measure movement of an object with respect to a surface without changing the characteristics of the surface during the crash, especially, in testing side impact crashes.

SUMMARY OF THE INVENTION

The present invention overcomes the disadvantages of the related art by providing a housing, an emitter emitting electromagnetic radiation, a rod having a graduated scale with a plurality of first regions and second regions for reflecting the electromagnetic radiation from the emitter. The first and second regions reflect different levels of electromagnetic radiation. The rod has a contact surface for contacting the object to be measured. A plurality of rollers positions the scale within the housing. A detector receives the reflected electromagnetic radiation directed at the scale and generates an output voltage corresponding the level of reflected radiation from the scale.

An advantage of the present invention is that accurate measurement of velocity of an object can be obtained without changing the crash characteristics of the object.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
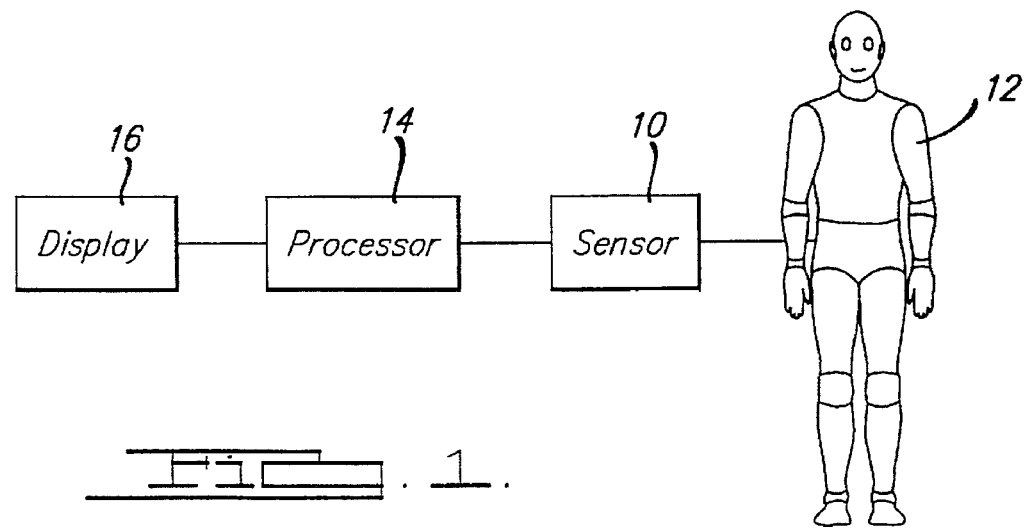
FIG. 1 is a sensor shown in relation to a crash dummy and its processing unit according to the present invention.

Referring to FIG. 1, a sensor 10 is shown in relation to a crash dummy 12. Sensor 10 measures the distance of movement between sensor 10 and an object such as a crash dummy 12. Typically, the output of sensor 10 is a voltage. The voltage is sent to a processor 14. Processor 14 converts the voltage into information to be displayed on a display 16. Processor 14 using time as a reference can convert distance into velocity and acceleration. Processor 14 may also be used to store the data for further processing.

Figure 2:
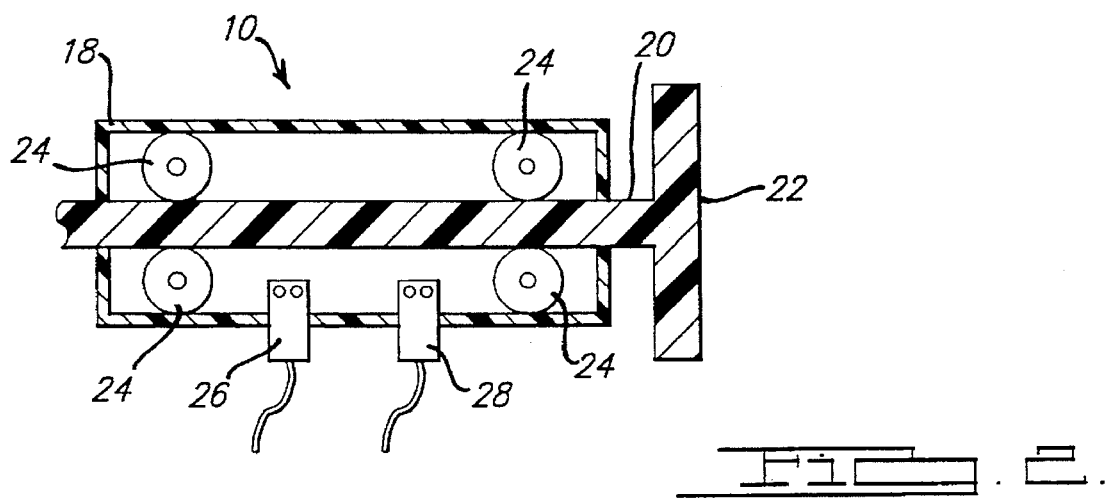
FIG. 2 is a cross-sectional view of the sensor according to the present invention.

Referring to FIG. 2, sensor 10 has a housing 18 that is preferably fixedly mounted to door trim or other location in the automobile. A rod 20 has a contact surface 22 used to contact the moving object. A guide such as rollers 24 guide rod 20 into the housing. Other types of guides may include an aligned surface of other apparatus having a positioning surface. An emitter 26 and a detector 28 are also mounted within housing 18.

Figure 3:
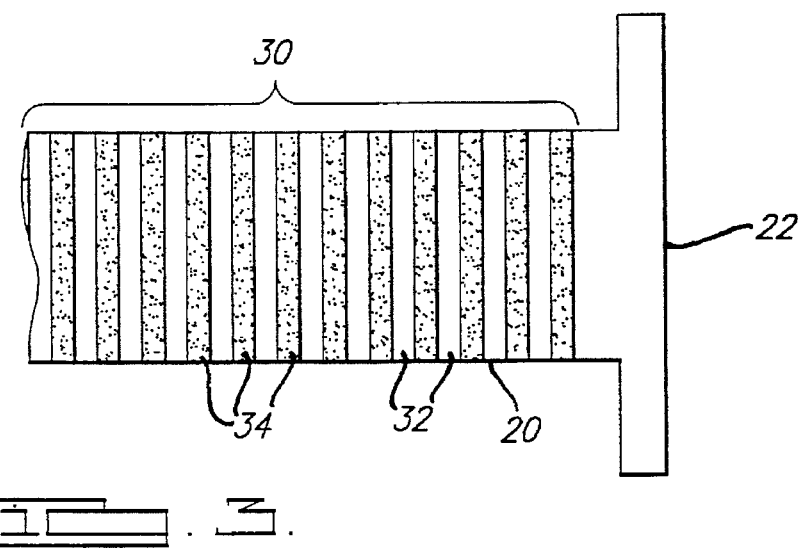
FIG. 3 is a top view of the graduated scale according to the present invention.

Referring now to FIGS. 2 and 3, rod 20 has a graduated scale 30 that preferably contains two regions that reflect emissions from emitter 26 at different rates. Graduated scale 30 preferably comprises equally sized high reflectance areas 32 and low reflectance areas 34. If infrared radiation is used white and black paint may be used for high reflectance areas 32 and low reflectance areas 34.

Housing 18 and rod 20 are preferably made of a durable material such as plastic. Housing 18 is shaped so that rod 20 can move out either end.

Rollers 24 may also be made from plastic. Rollers 24 guide rod 20 into housing 18 during measurement. Rollers 24 position rod 20 a relatively constant distance from emitter 26 and detector 28. Rollers 24 also provide rod 20 with a slight resistance so that the rod will not move during the setup of a crash test, for example. The resistance preferably does not provide any influence to the output of the sensor.

Figure 4:
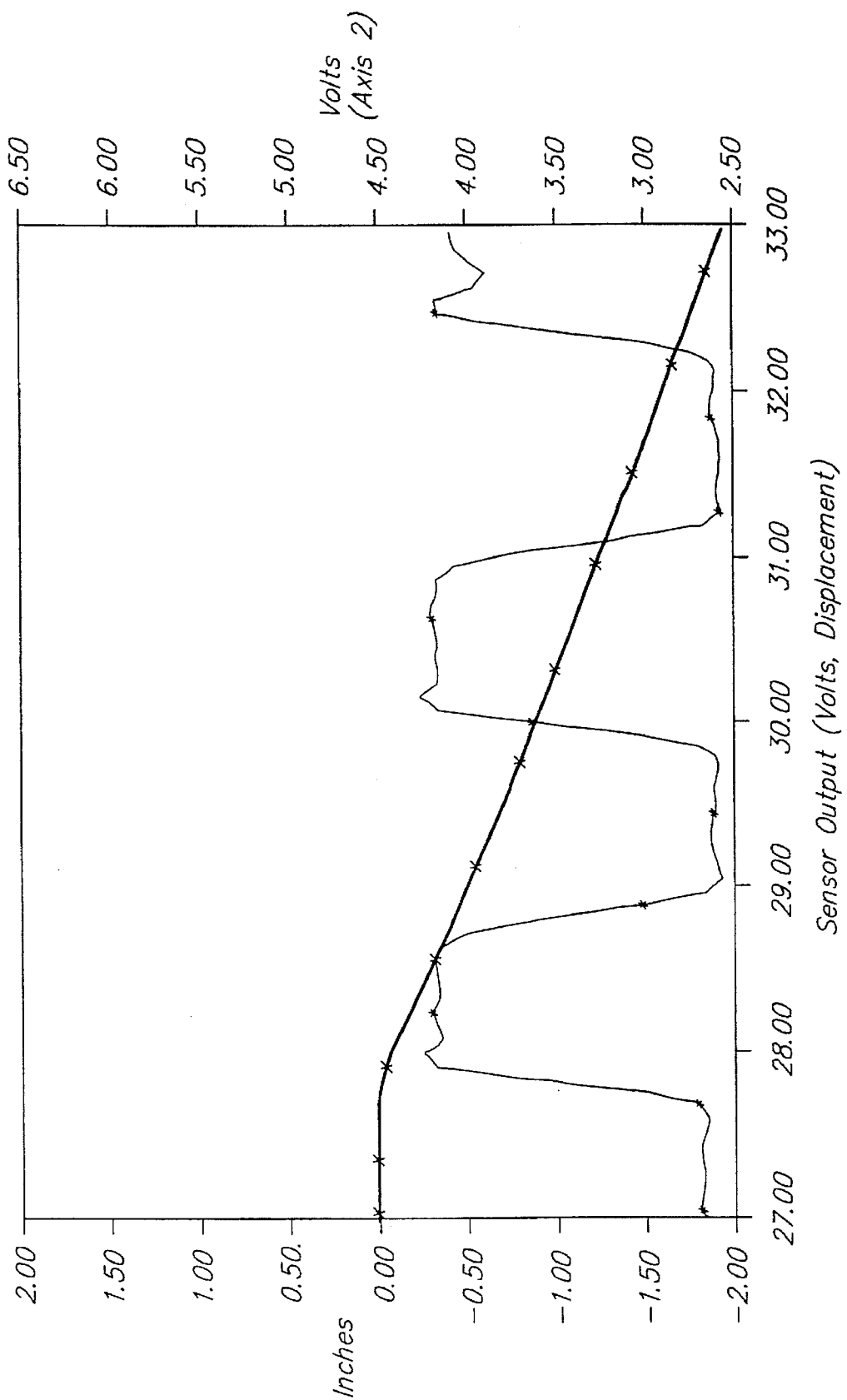
FIG. 4 is a plot of distance versus time and output voltage versus time of the detector.

Emitter 26 preferably emits electromagnetic radiation in the infrared region. Other emitters, however, may also be used such as microwave or laser. Emitter 26 is aimed to reflect the emitted electromagnetic radiation into detector 28. Detector 28 provides an output voltage based on the amount of reflected electromagnetic radiation Referring now to FIG. 4, a plot of output voltage versus time for a predetermined region of the output of emitter is shown. Because the time of each peak is known and the size of the graduated scale is known, the velocity and acceleration may be derived from the voltage output of detector.

In operation, rod 20 is manually extended out of housing 18 so that contact surface 22 is in contact with the object to be measured. As the object to be measured moves toward housing 18 the graduated scale 30 moves past emitter 26 and detector 28. The high reflectance area 32 and low reflectance area 34 cause the detector to generate different voltage levels corresponding to each area. The voltage levels and the time corresponding to them can be measured to determine the velocity of the rod is which can be converted into the velocity of the object in a processor 14.

As would be evident to one skilled in the art, several modifications of the invention may be made while still being within the scope of the appended claims. For example, the emitter emission frequencies and the materials to cause the reflectivity of the graduated scale may be changed.

What is claimed is:

1. An apparatus for measuring a characteristic of movement of an object comprising:

an emitter emitting electromagnetic radiation;

a rod having a graduated scale with a plurality of first regions and second regions for reflecting electromagnetic radiation from said emitter, said first regions and said second regions reflecting different levels of electromagnetic radiation, said rod having a contact surface for operatively contacting said object;

a detector for receiving said electromagnetic radiation directed at said scale, said detector generating an output voltage corresponding to the level of reflected radiation from said scale.

2. An apparatus as recited in claim 1 further comprising a circuit for converting said output voltage o into a displacement of said object.

3. An apparatus as recited in claim 1 further comprising a circuit for converting said output voltage into a velocity of said object.

4. An apparatus as recited in claim 1 further comprising a circuit for converting said output voltage into an acceleration of said object.

5. An apparatus as recited in claim 1 wherein said radiation comprises light.

6. An apparatus as recited in claim 1 wherein said light comprises a wavelength of infra-red.

7. An apparatus as recited in claim 1 wherein said first and second regions are equally sized.

8. An apparatus for measuring a characteristic of movement of an object comprising:

a housing;

an emitter emitting electromagnetic radiation;

a rod having a graduated scale with a plurality of first regions and second regions for reflecting electromagnetic radiation from said emitter, said first regions and said second regions reflecting different levels of electromagnetic radiation, said rod having a contact surface for operatively contacting said object;

guide means for slidably positioning said scale within said housing; and a detector for receiving said electromagnetic radiation directed at said scale, said detector generating an output voltage corresponding to the level of reflected radiation from said scale.

9. An apparatus as recited in claim 8 further comprising a circuit for converting said output voltage into a displacement of said object.

10. An apparatus as recited in claim 8 further comprising a circuit for converting said output voltage into a velocity of said object.

11. An apparatus as recited in claim 8 further comprising a circuit for converting said output voltage into an acceleration of said object.

12. An apparatus as recited in claim 8 wherein said radiation comprises light having a wavelength of infra-red.

13. An apparatus as recited in claim 8 wherein said guide means comprises a plurality of rollers.

14. An apparatus as recited in claim 8 wherein said first and second regions are equally sized.

15. An apparatus as recited in claim 8 wherein said rollers provide a resistance to movement of said rod.

16. A method for determining a characteristic of movement of an object comprising the steps of:

providing a rod having a graduated scale, said rod having a contact surface for operatively contacting said object;

extending rod partially out of said housing;

positioning said contact surface against said object;

emitting electromagnetic radiation to reflect from said graduated scale;

receiving the reflected electromagnetic radiation; and generating an output voltage proportional to said received electromagnetic radiation;

converting said output voltage into a characteristic of movement of the object.

17. A method as recited in claim 16 wherein said characteristic is displacement.

18. A method as recited in claim 16 wherein said characteristic is velocity.

19. A method as recited in claim 16 wherein said characteristic is acceleration.

20. A method as recited in claim 16 wherein said radiation comprises light having comprises a wavelength of about infra-red.

* * * * *